Feb. 8, 1927. 1,616,527
E. J. COOK
RETAINING DEVICE FOR OPERATIVELY CONNECTING WINDOW
CONTROL MECHANISM TO WINDOWS
Filed July 16, 1923

Inventor
Everett J. Cook
By
Attorneys

Patented Feb. 8, 1927.

1,616,527

UNITED STATES PATENT OFFICE.

EVERETT J. COOK, OF TOLEDO, OHIO, ASSIGNOR TO THE DURA COMPANY, OF TOLEDO, OHIO, A CORPORATION OF DELAWARE.

RETAINING DEVICE FOR OPERATIVELY CONNECTING WINDOW-CONTROL MECHANISM TO WINDOWS.

Application filed July 16, 1923. Serial No. 651,866.

The invention relates to window control mechanisms and refers particularly to a retaining device for operatively connecting a window control mechanism to a window.

The invention has for its object the provision of a retaining device which yieldably connects a window control mechanism to a window and which at all times prevents rattling or vibration at the points of connection. Another object is the provision of a retaining device which may be manufactured at a comparatively low cost and which may be readily assembled. A further object is the provision of a retaining device which permits of the easy disengagement of the window from the window control mechanism. Other objects of the invention reside in the novel features of construction and combinations and arrangements of parts as more fully hereinafter set forth.

Figure 1:
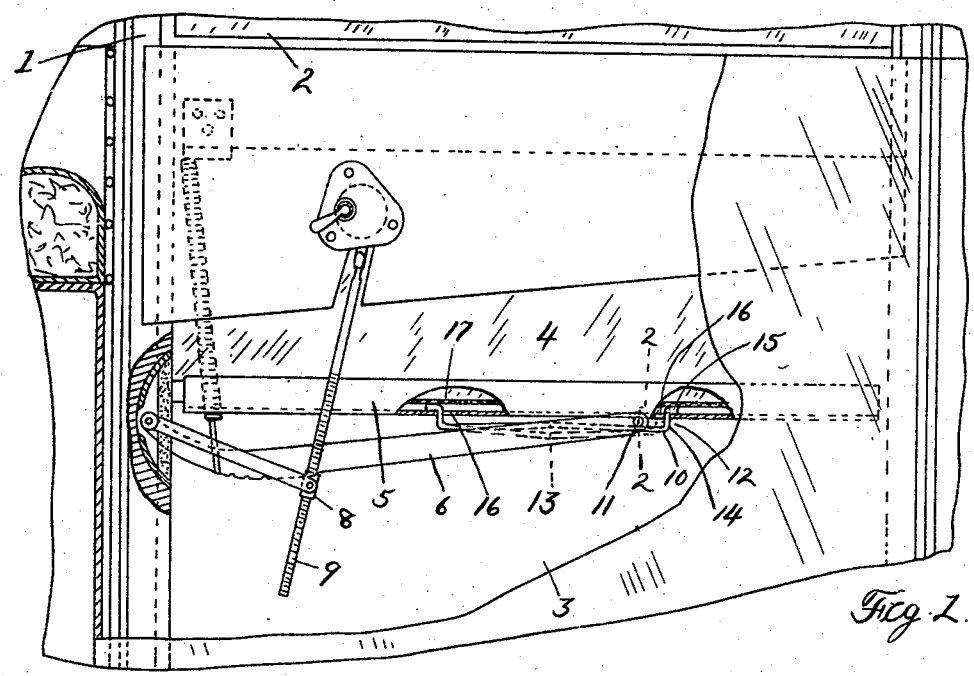
Figure 1 is an interior view of a portion of a motor vehicle door with my invention applied.

1 is the door of the motor vehicle having in its upper portion the window opening 2 and in its lower portion the chamber 3. 4 is the usual closure or window which is slidable in vertical run-ways in the door into and out of the chamber 3. The window comprises a glass plate and a channel-shaped sheet metal strip 5 embracing and secured to the lower edge of the glass plate.

For raising and lowering the window, I have provided the pivotal control arm 6 which may be swung about its pivot in any suitable manner, but which, as shown, is operated through the arm 6 nonrotatably connected to the control arm and carrying at its outer end the nut 8 which is threadedly engaged in by the rotatable screw 9.

For the purpose of operatively connecting the control arm 6 to the window 4, I have provided the resilient rod 10 which is secured to the channel-shaped strip 5 of the window and cooperates therewith to embrace the pin 11 extending transversely of and secured to the outer end of the control arm as by riveting. The resilient rod has the hooked end portions 12 engageable in the base of the strip and the intermediate portion 13 normally bowed toward the strip to resiliently hold the pin 11 against the base of the strip, the arrangement being such, however, that the pin may slide longitudinally of both the rod and strip while the window is being raised and lowered. The rod is preferably round and the base of the strip is also preferably round, both engaging in an annular groove of the pin to normally prevent disengagement of the pin.

For securing the resilient rod 10 to the channel-shaped strip 5, each hooked end portion 12 of the rod has the transverse portion 14 and the terminal lateral portion 15, the latter being engageable with the upper side of the base of the strip and located below the lower edge of the glass plate.

Figures 2, 3:
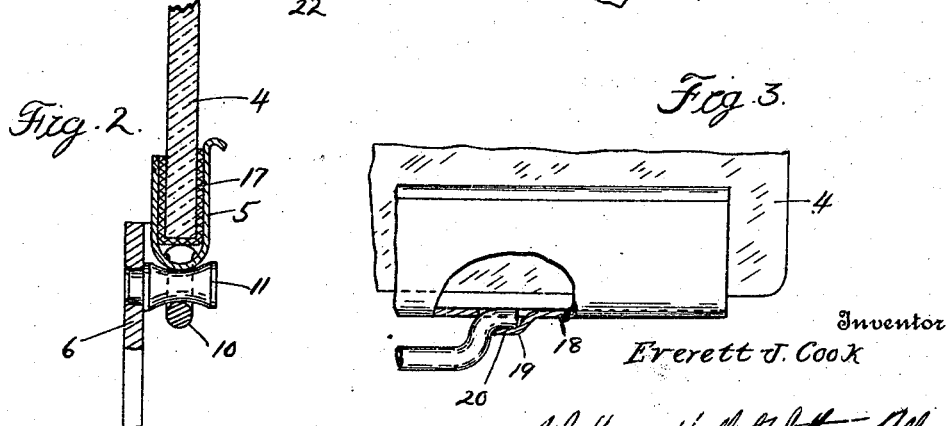
Figure 2 is a cross section on the line 2—2 of Figure 1.

As shown in Figures 1 and 2, the base of the strip 5 is provided with the elongated openings 16 each of a length sufficient to permit of the insertion of the lateral portions 15 of the rod 10, these openings being spaced apart a distance less than the length of the rod. To secure the rod to the strip, one end portion 12 of the rod is inserted through an opening in the strip and the rod is then moved longitudinally outward to bring its transverse portion 14 against the outer end wall of the opening, after which the rod is bowed away from the strip as shown by the dotted lines in Figure 1 to register the lateral portion 15 at the opposite end of the rod with the other opening in the strip, after which this end of the rod is moved toward the strip to bring the lateral portion above the base of the strip. Then the rod is permitted to assume its normal form when the lateral portion will be moved longitudinally of the strip to engage the upper surface of its base. At this time, both transverse portions of the rod preferably abut against the outer end walls of the openings in the strip so that end play of the rod is prevented. Owing to the fact that the intermediate portion of the rod is bowed upwardly its terminal lateral portions will be held against the upper surface of the base of the strip. Furthermore, the felt 17 embracing the lower edge of the glass plate and located inside the strip 5 assists in holding the terminal lateral portions of the rod in place. This pressure, however, is slight inasmuch as the base of the strip is rounded and tends to prevent downward movement of the glass plate, the lower edge of which is substantially flat.

In the modification shown in Figure 3, the channel-shaped sheet metal strip 19 embracing and secured to the lower edge of the glass plate has the tongues 19 struck downwardly from its base, these tongues having the laterally extending portions 20 engageable beneath the terminal lateral portions of the resilient rod and spaced at such a distance below the main portion of the base of the strip that the upper surfaces of the lateral portions of the rod are substantially flush with the upper surface of the base of the strip.

Figure 4:
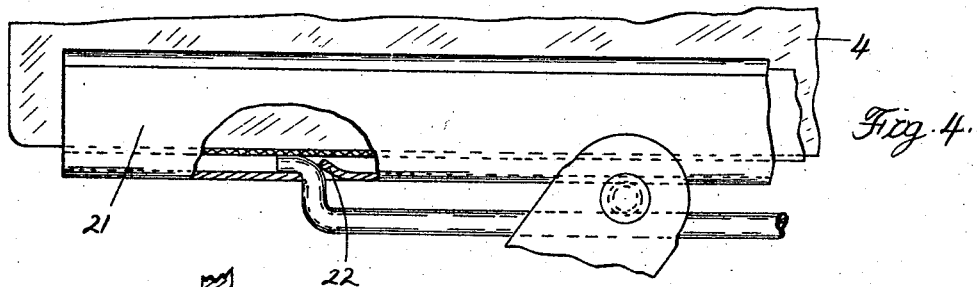
Figures 3 and 4 are elevations partly in section of modified forms of retaining devices.

In the modification shown in Figure 4, the base of the channel-shaped sheet metal strip 21 has the tongues 22 struck upwardly therefrom to permit of the insertion of the ends of the resilient rod, after which, these tongues are bent downwardly to engage the same.

When it is desired to disengage the window from the control mechanism, the former is tipped out of the run-ways in the door and raised to its uppermost position, at which time a tool, such as a screw driver, may be inserted between the channel-shaped strip at the lower edge of the window and the resilient rod to pry the latter away from the former, after which, by tipping the window still further the resilient rod and strip disengage from the pin upon the control arm of the control mechanism.

From the above description it will be seen that I have provided a very simple construction of device for retaining the window control mechanism operatively connected to a window. Also, that this device may be readily assembled and further permits of ready disengagement of the window. It will further be seen that the device prevents rattling of the parts at the points of connection owing to the fact that the rod secured to the channel-shaped strip at the lower edge of the glass plate is resilient and normally bowed toward the strip so that it will hold the pin upon the control arm in firm engagement with the strip at all times.

What I claim as my invention is:

1. The combination with a closure, of a member for actuating the same, and a resilient rod secured to said closure and resiliently holding said member against said closure, said rod having the portion intermediate its ends spaced from said closure a less distance than its end portions.

2. The combination with a closure having a channel-shaped strip at one edge, of a member for actuating said closure, and a resilient rod secured to said strip and resiliently forcing said member into contact with said strip, said rod having the portion intermediate its ends spaced from said closure a less distance than its end portions.

3. The combination with a closure, of a member for actuating said closure, and a resilient rod having a portion intermediate its ends normally bowed toward said closure and engageable with said member for holding the same in contact with said closure.

4. The combination with a closure having a channel-shaped strip at one edge, of a control member for said closure, a transversely extending member upon said control member and extending adjacent to said strip, and a resilient rod having a portion engageable with said transversely extending member and bowed toward said strip for holding said transversely extending member against said strip.

5. The combination with a closure having a channel-shaped strip at one end, of a control member for said closure, a transversely extending member upon said control member extending adjacent to the base of said strip, and a rod having its end portions insertable through the base of said strip and engaging the same and a portion intermediate its end portions engageable with said transversely extending member.

6. The combination with a closure having a channel-shaped strip at one edge, the base of said strip being rounded, of a control member for said closure, a transversely extending annular grooved member upon said control member engageable with the base of said strip, and a resilient rod extending adjacent and parallel to the base of said strip, said resilient rod having a portion provided with a rounded surface engageable with said transversely extending member.

7. The combination with a closure having a metal strip at one edge, of a control member for said closure, a transversely extending member upon said control member, and a resilient retaining rod for holding said transversely extending member against said strip, said rod having its ends insertable through said strip.

8. The combination with a closure, of an actuating member therefor extending transversely thereof, and yieldable means secured to said closure and engaging said actuating member to hold the same against said closure, said actuating member being movable relative to said yieldable means.

9. The combination with a window member, of an actuating member therefor, and yieldable means carried by said window member for operatively connecting said actuating member to said window member, said yieldable means normally holding said actuating member from movement away from or toward said window member.

10. The combination with a window member, of an actuating member therefor, and cooperating members carried by said window member and engaging said actuating member to operatively connect the latter to said window member, one of said cooperating members being yieldable, away from the other and said actuating member being movable along said cooperating members.

In testimony whereof I affix my signature.

EVERETT J. COOK.